Jan. 17, 1967  B. H. PINCKAERS  3,299,361
CONDITION DETECTING APPARATUS
Filed March 9, 1964  2 Sheets-Sheet 1

INVENTOR.
BALTHASAR H. PINCKAERS
BY
Francis A. Sirr
ATTORNEY

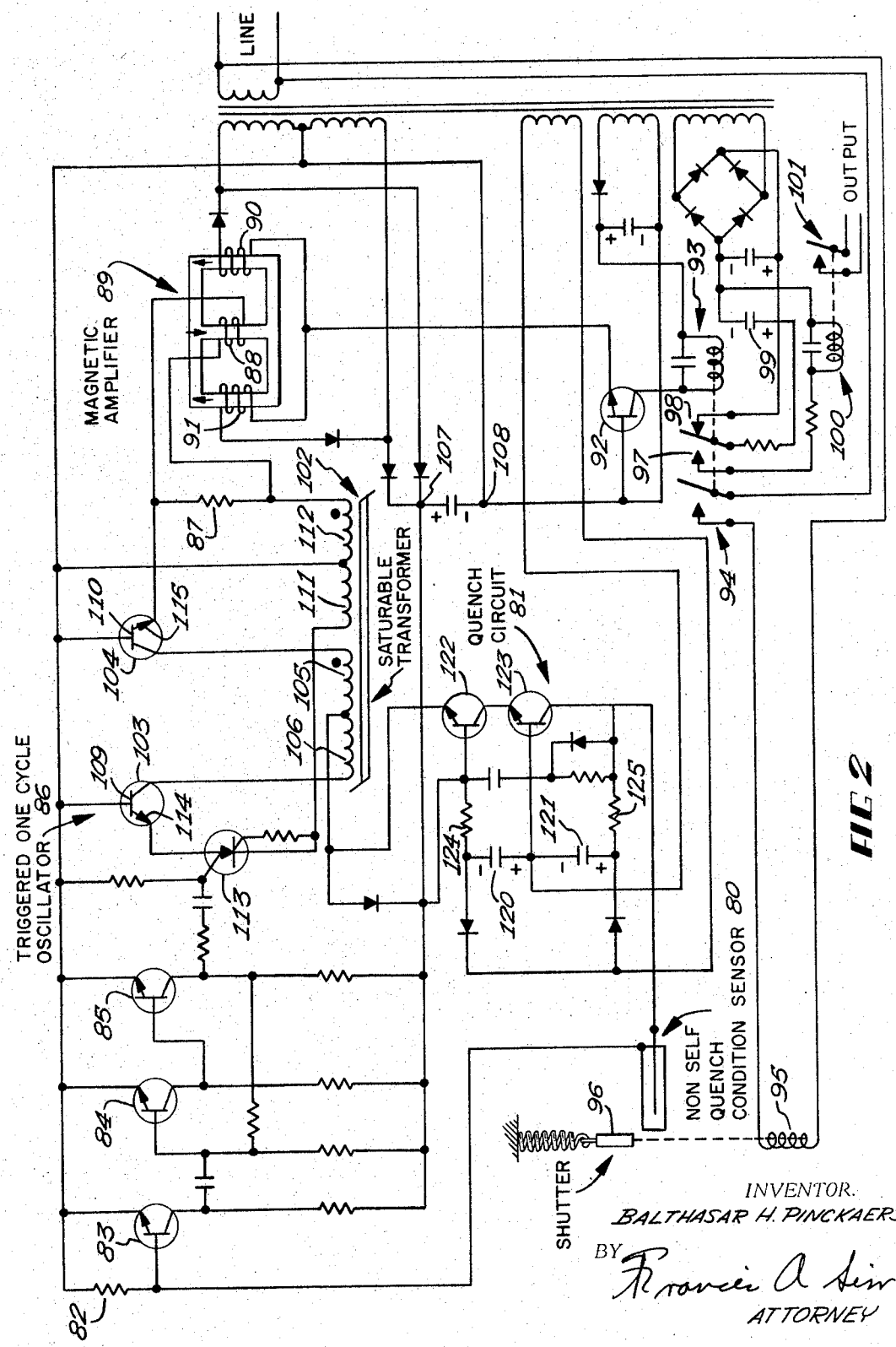

United States Patent Office 3,299,361
Patented Jan. 17, 1967

3,299,361
CONDITION DETECTING APPARATUS
Balthasar H. Pinckaers, Edina, Minn., assignor to Honeywell Inc., a corporation of Delaware
Filed Mar. 9, 1964, Ser. No. 350,410
7 Claims. (Cl. 328—6)

The present invention is concerned with an improved condition detecting apparatus. I disclose an embodiment of my invention which includes a condition detecting apparatus incorporating a continuous component checking feedback mechanism to continuously check the ability of the apparatus to detect the condition to which it is sensitive.

Generally, continuous component checking apparatus are known in the art, and, stated in its simplest form, consist of an arrangement whereby a condition sensor originates a signal upon the presence of a condition, to cause a first output to appear at a given point in the system. This first output is effective, in one manner or another, to interrupt the condition sensor signal, thus causing the first output to continuously cycle as the result of the actual presence of the condition and then as a result of the interruption of the condition, this being a simulated absence of the condition, a second output is provided which is responsive only to a continuous cycling of the first output.

With such a system, it can be generally stated that a component failure anywhere within the system will cause the first output to continuously exist at one state or the other, and a cycling between the two states does not occur. Thus, the second output, which is only responsive to continuous cycling of the first output, is rendered ineffective and a second output occurs to indicate the absence of the condition being detected, this being characterized as a safe failure.

A specific type condition sensor which has found wide acceptance in the field of flame detection is that of an ultraviolet responsive gas discharge device, generally of the Geiger-Müller construction. It has been found that a condition sensor which is responsive to ultraviolet radiation responds to both gas and oil flame, as well as to pulverized coal and other fuels, and is not disturbed by hot incandescent fire brick and the like which may exist in the background through the area in which the flame is viewed by the condition sensor. Such sensors however have an inherent background count rate even when a flame is not present. This count rate, also sometimes referred to as a signal pulse, is of a random magnitude and of an infrequent interval. This interval, while being infrequent, is quite random and it is only when considering the average frequency that it can be characterized as being of an infrequent interval. For example, the background count rate may be such that a number of background counts are closely spaced in time and will be followed by an extended period of no count whatsoever. The average count rate over the entire period is however low.

When such a condition sensor is subjected to a condition to which it is sensitive, for example a flame, the count rate, while still being somewhat random, is of a more frequent interval and the average frequency of these signal pulses is distinguishably greater than that found when only a background count is present.

In accordance with the teachings of the prior art, the count or signal pulse derived from such a condition sensor is applied to the input of a pulse stretcher. This pulse stretcher receives the somewhat unpredictable condition sensor signals and modified the signal to provide an output magnitude of a uniform characteristic. Here again, however, the output of the pulse stretcher is at a rate or frequency which is related to the average count frequency being supplied by the condition sensor. The output of the pulse stretcher is thus indicative of a background count or of a count indicative of the presence of the condition.

The output of the pulse stretcher, in accordance with the teachings of the prior art, is then applied to an integrator and this integrator provides a time delay to distinguish between the two count rates. The overall system thus discriminates between a background count and a count indicative of the presence of the condition to be detected.

When such a prior art system is utilized in an arrangement having continuous component checking, it is necessary that no failure be allowed to occur within the detecting apparatus, consisting generally of the sensor, the pulse stretcher, and the integrator, which can produce a signal transmission characteristic having less than a minimum time delay, as related to the pulse stretch time of the pulse stretching network. When these conditions are met, it is not possible to have a component failure within the condition detecting apparatus which is sufficient to cause cycling of the first above-mentioned output in a manner to simulate proper operation of the continuous component checking principle.

With the foregoing considerations in mind, my invention is concerned with an improved pulse stretcher construction in which the output of the pulse stretcher is of a characteristic controlled by a saturable transformer forming an integral part of a triggered one cycle oscillator. A characteristic of my improved oscillator is such that the voltage-time integral of its output remains substantially uniform and is independent of variations in line voltage and variations in magnitude of the signal pulse received from the condition sensor.

As a result, the output of my improved pulse stretcher is of a uniform and a predictable characteristic. This characteristic is not susceptible to changes with changes in ambient temperature and the like, as is present in prior art pulse stretchers having resistor-capacitor combinations for producing the pulse stretching function.

As a further feature of my invention, I provide an improved integrator wherein the integration is provided by a magnetic amplifier which is effective to integrate the output of the triggered one cycle oscillator and to provide an output only in the event that the triggered one cycle oscillator is operating at a frequency indicative of the presence of a condition responsive count at the condition sensor. The use of a magnetic amplifier as an integrator insures that the time delay of the integrator remains uniform and does not vary in the manner of the resistor-capacitor integrators of the prior art. In my magnetic amplifier construction, the integration time constant is provided by the characteristics of the saturable material of the amplifier and I have found that this characteristic remains uniform and stable with variations in temperature and the like.

My invention will be apparent to those skilled in the art upon reference to the following specification, claims, and drawings, of which:

FIGURE 1 is a schematic representation of a first embodiment of my invention, utilizing a self-quench condition sensor, and FIGURE 2 is a schematic representation of a second modification of my invention, utilizing a non-self-quench condition sensor.

Referring specifically to FIGURE 1, reference numeral 10 designates generally a self quench condition sensor having a cathode 11 and an anode 12. A condition senor of this type can be characterized generally as a Geiger tube and is provided with an ionizable gas fill.

The presence of radiation energy, to which the condition sensor 10 is sensitive, causes ionization of the gas fill and causes a short time duration signal pulse of electrical current to pass between the anode and the cathode. Such a condition sensor has an inherent background count and this background count provides a random and infrequent signal pulse rate. If condition sensor 10 is utilized to detect the presence of flame, the count rate (the signal pulses received from the condition sensor) is also of a random motive but a much more frequent rate. In the absence of flame, ionizable radiation which permeates the area from unpredictable and outside source causes a random and an infrequent background count rate. It is necessary that an apparatus be provided to distinguish between the background count rate and the count rate which is produced by the presence of flame.

In order to distinguish between these two count rates, I provide a unique structure. A pulse stretcher in the form of a triggered one cycle oscillator, designated generally by means of reference numeral 13, is effective to be triggered by a count pulse received from condition sensor 10 and to provide, at an output resistor 14, a stretched pulse of electrical energy having a unique characteristic, as will be described.

The output of oscillator 13, at resistor 14, is applied to control winding 15 of a self saturating magnetic amplifier, designated generally by means of reference numeral 16. Magnetic amplifier 16 functions as an integrator and the output of the magnetic amplifier is connected to control the state of conduction of a transistor 17, this transistor 17 being connected to control the state of energization of a first output relay 18. As will be described, output relay 18 normally cycles between states of energization and de-energization. So long as relay 18 continues to cycle, a second output relay 19 is continuously energized. Relay 19 is the ultimate output of the apparatus of FIGURE 1 and, for purposes of simplicity, relay 19 is shown as controlling a switch 20 connected to leads labeled "output."

Operating voltage for the apparatus of FIGURE 1 is derived from power line conductors 21 and 22, these conductors being connected to the primary windings of power transformers 23 and 24. Transformer 24 has a bridge rectifier connected to the secondary winding thereof and this rectifier is effective to charge a capacitor 25. Capacitor 25 is connected through switch 26 of relay 18 to charge a further capacitor 27. Deenergization of relay 18 closes a switch 28 to connect the now charged capacitor 27 to the winding of relay 19, this winding being bridged by a further capacitor 29. As will be appreciated, continuous cycling of relay 18 is effective to alternately charge capacitor 27 and then discharge this capacitor into the winding of relay 19 to charge capacitor 29. Cycling of relay 18 is thus effective to maintain relay 19 continuously energized, in a manner to be described.

Transformer 23 is provided with secondary winding means 30 and 31, these secondary winding means being effective to establish D.C. sources of operating voltage. A first source exists at terminals 32 and 33, a second source exists at terminals 34 and 35, and a third source exists at terminals 35 and 36.

Source 32–33 is the source of operating voltage for the output electrodes 37 and 38 of transistor 17 and this source is connected in series with these output electrodes and the winding of relay 18.

Source 34–35 constitutes a source of operating voltage for transistors 39 and 40 contained within the one cycle oscillator 13.

Source 35–36 is a source of operating voltage for the electrodes of condition sensor 10 and the voltage of this source is effective to charge a capacitor 40, to the polarity indicated, through a resistor 41, to form what is essentially a relaxation oscillator in which the condition sensor 10 is the discharge element.

Transformer 23 is also provided with a secondary winding means 42. This secondary winding means is connected through rectifiers 43 and 44 to the gate windings 45 and 46 of magnetic amplifier 16. Also in circuit with these windings of the magnetic amplifier are the input electrodes 37 and 47 of transistor 17. As has been mentioned, magnetic amplifier 16 is connected to be a self saturating magnetic amplifier and the alternating voltage provided at winding means 42 is rectified in its alternate half cycles by rectifiers 43 and 44 to provide magnetizing current for the core of magnetic amplifier 16 and to thus saturate the core. With the core saturated, the windings 45 and 46 present a minimum impedance to current flow and a forward bias current flows to the input electrodes 37 and 47 of transistor 17 to render this transistor conductive. Conduction of transistor 17 causes a current to flow from terminal 32 through the output electrodes of transistor 17 and through the winding of relay 18 to terminal 33. Thus, winding 18 is shown as being energized. This is the state of winding 18 in the absence of an input signal at control winding 15 of magnetic amplifier 16.

Referring now to the operation of the apparatus of FIGURE 1, the presence of a single pulse of energy to which condition sensor 10 is sensitive causes a count pulse to flow and to discharge capacitor 40. This count pulse circuit can be traced from the left hand plate of capacitor 40 through condition sensor 10 to series connected resistors 48 and 49 to the right hand plate of capacitor 40. This signal pulse not only discharges capacitor 40 to thus substantially remove the operating voltage from the electrodes of condition sensor 10 and contributes to the quenching of this sensor, but also, this signal pulse provides a short time duration signal voltage at resistor 49, this voltage being such that the upper terminal of this resistor is positive. This voltage, derived across resistor 49, constitutes the output of the condition sensing means.

The output of the condition sensing means is connected through a capacitor 50 to the input of the one cycle oscillator 13.

It will be considered at this time that oscillator 13 is in a dormant state. In this state, transistors 39 and 40 are non-conductive and inhibiting means in the form of a silicon controlled rectifier 51 (SCR) is likewise non-conductive. The presence of the above described signal pulse at resistor 49 is effective to provide a forward biasing current for transistor 39 and is at the same time effective to "turn on" the SCR.

This forward biasing current can be traced from the upper terminal of resistor 49 through capacitor 50, resistor 52, and the input electrodes 53 and 54 of transistor 39 to the bottom terminal of resistor 49. This current flow produces two control effects. The first effect is to render transistor 39 conductive. Conduction of this transistor causes a current to flow from power supply terminal 35 through the output electrodes 54 and 55 of transistor 39 and through the primary winding 56 of saturable transformer 57 to power supply terminal 34. This current flow causes a voltage to be generated in feedback winding 58 such that the right hand terminal of this winding is positive.

The second effect of the above traced input current to oscillator 13 is to provide a voltage drop across resistor 52 which is of a polarity to render SCR 51 conductive. With a positive voltage now present at the right hand terminal of winding 58, and with SCR 51 conductive, a positive feedback current is provided to maintain transistor 39 conductive and to cause the output current of this transistor to gradually increase, as controlled by the rate of saturation of the core of transformer 57. After a relatively long time duration, as compared to the duration of the signal pulse derived from the condition sensor 10, the core of transformer 57 is saturated and now the magnetizing current, on account of the nearly square-hysteresis loop magnetic material, rises very rapidly to a value at which the loop gain is rendered less than "1," so that the positive feedback is no longer sufficient to keep transistor 39 in saturation. The feedback voltage then rapidly drops to zero and transistor 39 is rendered non-conductive. At the same time SCR 51 is rendered non-conductive because the current through it is reduced below the holding current value.

At this time, the magnetic flux present within the core of saturable transformer 57 represents a quantity of electrical energy. This quantity of electrical energy, necessary to saturate the core, is a characteristic of the core itself and does not change with ambient temperature variation, line voltage variation, or the like. Furthermore, this quantity of electrical energy is not controlled by the magnitude of the input signal pulse which was derived from resistor 49 and which was effective to initiate the one-half cycle of oscillator 13 which caused this flux to be stored within the core of transformer 57. Also, during this build up of flux, a nearly constant voltage is generated in the secondary winding means 59 of transformer 57 and this voltage is rectified to produce an output voltage across resistor 14. This output voltage is such that terminal 60 is positive and terminal 61 is negative.

The flux within saturable transformer 57 now begins to collapse and in so collapsing a voltage is generated within secondary winding 62 of such a polarity as to render the left hand terminal of this secondary winding positive. This voltage constitutes a forward bias voltage for the input electrodes 63 and 64 of transistor 40 and this transistor is rendered conductive. Conduction of this transistor, between its output electrodes 64 and 65, is effective to generate a positive feedback voltage within winding 62, which is effective to maintain transistor 40 conductive. Again a nearly constant voltage is generated in the windings of transformer 57 and the core flux is, as time goes on, driven from "positive" saturation (reached at end of first half-cycle) to "negative" saturation. Upon reaching negative saturation the loop gain, through the reduction of positive feedback, again becomes rapidly less than 1 and transistor 40 is rendered non-conductive. Again the flux wants to change from the staturation value to the residual value, and in so doing reverses the polarity of all generated voltages in the transformer 57 windings and thus attempts to render transistor 39 conductive once again. This, however, is prevented by SCR 51, which is non-conductive now, and therefore prevents the supply of a positive feedback current to the emitter of transistor 39. The core flux of transformer 57 merely decays to the residual value (negative). Were it not for this "inhibiting" action of SCR 51 the oscillation would sustain, and the oscillator, rather than being a triggered one-cycle oscillator, would be a free-running square wave oscillator.

Thus, one cycle of operation of the oscillator is completed.

The core flux remains now at this (negative) residual value until subsequently another input pulse is provided across resistor 49 and this input signal pulse will initiate a subsequent cycle of operation of the oscillator. If a flame is present, this pulse occurs at a relatively frequent interval and oscillator 13 oscillates at an average rate that is much higher than the rate which is produced by only background count of the condition sensed.

As I have mentioned, the output of the one-cycle oscillator 13 is provided at resistor 14. Secondary winding means 59 of transformer 57 is effective to produce full wave rectification of the square wave voltage operated in the windings of transformer 57. The D.C. voltage provided at terminals 60 and 61 is connected to control winding 15 of magnetic amplifier 16 to produce a flux which tends to reset the core of the magnetic amplifier from its normally saturated condition. If frequent cycling of oscillator 13 is experienced, the core is in fact reset from saturation and the impedance represented by windings 45 and 46 of the magnetic amplifier increases to the point where the forward biasing current for transistor 17 is reduced and this transistor is rendered nonconductive. Nonconduction of this transistor causes relay 18 to be deenergized.

To this point in the operation of FIGURE 1 I have described the manner in which condition sensor 10 provides signal pulses to pulse stretching oscillator 13 to control integrating magnetic amplifier 16 to deenergize relay 18, but only in the event that condition sensor 10 is experiencing a count at a higher average frequency.

I have chosen in FIGURE 1 to show a continuous component checking apparatus in which relay 18 is provided with a switch 70 to control the energization of a shutter operating coil 71, this coil controlling a spring biased shutter 72. Upon deenergization of the winding of relay 18, the shutter 72 is positioned to interrupt the viewing of a flame by condition sensor 10. Thus, the simulated absence of flame is originated. In response to this simulated absence of flame, condition sensor 10 experiences only the random background count, and while oscillator 13 is effective to stretch each of these counts, the voltage thus derived across resistor 14 does not maintain magnetic amplifier 16 in the unsaturated condition and the amplifier again self saturates to reenergize relay 18. Reenergization of relay 18 interrupts the circuit for winding 71 and the shutter is again spring biased away from the blocking position for condition sensor 10. Condition sensor 10 is thereby allowed to again sense the actual presence of flame. In this manner, relay 18 continues to cycle between an energized and a deenergized state in response to the ability of the apparatus to sense the actual presence of flame and to then sense the simulated absence of flame. So long as relay 18 continues to cycle, relay 19 remains energized and switch 20 is closed to provide an output indicative of the presence of flame.

I have found that the use of a condition sensor of the type having an inherent background count is a continuous component check apparatus required a pulse stretcher and an integrator combination which is incapable of failing in a manner to provide a time delay which is smaller than a given minimum time delay, as related to the cycling rate required of relay 18 to maintain relay 19 continuously energized.

With the structure of my invention, the triggered one cycle oscillator 13 provides a uniform quantity of electrical energy at resistor 14 for each signal pulse which is applied to the input of the oscillator, provided that the signal pulse is applied at a time when the oscillator is not operating within a cycle of its operation. I have chosen the time period of a cycle of oscillator 13 to be longer than the time interval between the average of the frequent counts experienced when condition sensor 10 is sensing flame. Thus, oscillator 13 normally experiences an average continuous cycling in the presence of flame. This continuous cycling of course must be related to an average condition since, even though condition sensor 10 experiences frequent ionizing events in the presence of flame, it is only when considering the average that it can be stated that the one cycle oscillator 13 is substantially continuously oscillating. It must be remembered that even with a flame present, the ionizing events impinging upon condition senor 10 are at a random though frequent interval, and the average rate is such as to maintain the oscillator continuously oscillating.

Furthermore, since the quantity of energy supplied at resistor 14 for each cycle of oscillator 13 is dependent primarily upon the magnetic properties of the core material of transformer 57, this quantity of electrical energy does not vary with ambient temperature change, or reasonable variations in line voltage. Furthermore, the voltage-time integral of the voltage present at resistor 14 remains substantially constant.

Likewise, an integrating means in the form of a magnetic amplifier 16 provides integration which is related primarily to the magnetic properties of the core of the amplifier. It has been found that a fault such as the shorting of a portion of the turns of control winding 15 varies the properties of the magnetic amplifier in a manner such that the total time delay provided by the amplifier is substantially constant. As a result, a stable and unchanging time delay is provided by the combination of oscillator 13 and magnetic amplifier 16, such that a failure of components is unable to provide a situation whereby the background count of condition sensor 10 may be effective to cause cycling of relay 18, falsely indicating the presence of flame.

In FIGURE 2 I have chosen to show a non self-quenching condition sensor 80, having the same general characteristics as condition sensor 10 of FIGURE 1. Reference numeral 81 designates a quench circuit for this condition sensor. The output of condition sensor 80 exists at resistor 82 which is connected through transistors 83, 84 and 85 to the input of a triggered one cycle oscillator 86. The output of oscillator 86 exists at resistor 87 and is connected to the control winding 88 of a self-saturating magnetic amplifier 89. The windings 90 and 91 of a magnetic amplifier 89 are connected to the input electrodes of a transistor 92, the output electrodes of transistor 92 being connected in circuit with the winding of a relay 93. Relay 93 is provided with a switch 94 to control a coil 95 operating a shutter 96. Relay 93 also includes switches 97 and 98 which are connected to alternately charge and then discharge a capacitor 99 to maintain a relay 100 continuously energized so long as relay 93 continues to cycle. The output of the apparatus of FIGURE 2 exists at switch 101, connected to a pair of conductors labeled "output."

The apparatus of FIGURE 2 differs only in its details from the apparatus of FIGURE 1 and embodies the principal features of my invention.

Here again, the one cycle oscillator 86 incorporates a saturable transformer 102 and a pair of transistors 103 and 104. The primary windings 105 and 106 of transformer 102 are connected to have a common terminal which is connected to the positive terminal 107 of a source of voltage, the negative terminal 108 of this source being connected to the base electrodes 109 and 110 of transistors 103 and 104 respectively.

Transformer 102 is also provided with a pair of feedback windings 111 and 112. Feedback winding 111 is connected with its left hand terminal connected through a silicon controlled switch 113 (SCS) to the emitter electrode 114 of a transistor 103. Feedback winding 112 has its right hand terminal connected through resistor 87 to the emitter electrode 115 of transistor 104.

As was the case in the structure of FIGURE 1, a count pulse from condition sensor 80 is effective to both provide a forward biasing voltage for transistor 103 of oscillator 89 and to also render the SCS 113 conductive. Conduction of transistor 103 is effective to provide feedback voltage at winding 111 to cause the core of saturable transformer 102 to be driven into saturation, over a timer period. Once the transformer core is saturated, the magnetic flux begins to collapse and transistor 104 is rendered conductive as transistor 103 is rendered nonconductive. Thus, the magnetic flux in the saturable transformer returns to a residual flux condition. Further oscillation of the oscillator is prevented by virtue of the fact that SCS 113 is no longer conductive and it does not become conductive until a further signal pulse is derived from the condition sensor 80.

The cycle of operation of oscillator 86 provides an output voltage across resistor 87 such that the upper terminal of this resistor is positive with respect to the lower terminal. This occurs when transistor 104 is conducting. The upper and lower terminals of this resistor are connected to control winding 88 of magnetic amplifier 89 and, in the manner of the construction of FIGURE 1, transistor 92 is rendered nonconductive when magnetic amplifier 89 is reset from its normal saturated condition.

Nonconduction of transistor 92 is effective to deenergize relay 93 and thus cause shutter 96 to be positioned to interrupt the viewing of flame by condition sensor 80. In the manner above described, relay 93 cycles in the presence of flame, and relay 100 is maintained continuously energized.

As I have mentioned, the use of a non self-quenching condition sensor 80 requires a quenching circuit 81. This quenching circuit is constructed and arranged such that capacitors 120 and 121 constitute the source of operating voltage for condition sensor 80. Normally, in the absence of counts, when the triggered one-cycle oscillator is off or non-conductive transistors 122 and 123 are also non-conductive. Therefore, then, the voltage on capacitor 120 appears across transistor 122 (from collector to base) and the voltage on capacitor 121 is across transistor 123 (also collector to base). The combined voltage across transistors 122 and 123 in series with the relatively low supply voltage across terminals 107–108 appears then across condition-sensor 80. When now sensor 80 becomes conductive and, in the manner described, renders transistor 103 of the triggered oscillator conductive also transistors 122 and 123 are rendered conductive for the duration of the entire period of the triggered oscillator. This is so, because the supply current for the triggered oscillator flows through the input circuit of transistor 122. When transistors 122 and 123 are conductive and in saturation the voltage across them is negligibly small by virtue of the presence of resistors 124 and 125. (See FIGURE 2.) Therefore, when the one-cycle oscillator is triggered on, the voltage across condition sensor 80 is suddenly decreased and for the duration of the oscillator period is substantially equal to the low voltage between terminals 107–108. This causes the condition sensor 80 to cease conduction or to quench.

While a somewhat different construction of a one cycle oscillator is provided in the construction of FIGURE 2, the same general considerations discussed in connection with FIGURE 1 can be followed when considering the structure of FIGURE 2. I have elected to disclose two embodiments of my invention to aid those skilled in the art in the following teachings of my invention and it is intended that the scope of my invention be limited solely by the scope of the appended claims.

I claim as my invention:

1. In combination,
   a source of signal pulses of a frequent rate,
   a triggered one cycle oscillator having an input and a D.C. output and a frequency of oscillation which is less than said frequent rate and having an input and an output,
   means connecting said source of signal pulses in controlling relation to the input of said oscillator to trigger the same and to cause substantially continuous D.C. output in response to the frequent rate of signal pulses,
   a magnetic amplifier having output winding means and input winding means,
   D.C. voltage means,
   means connecting said D.C. voltage means to said output winding means to normally saturate said magnetic amplifier,
   and means connecting the D.C. output of said oscillator in controlling relation to the input winding means of said magnetic amplifier to reset the same from saturation only in response to substantially continuous D.C. output of said oscillator.

2. A flame detector comprising,
   a flame sensor having an inherent background signal pulse rate of a random interval and a signal pulse rate of a frequent interval when subjected to a flame,
   a triggered one cycle oscillator having an input and an output,
   means connecting said flame sensor in controlling relation to the input of said oscillator to cause random cycling thereof in the absence of flame and to cause frequent cycling thereof in the presence of flame,
a magnetic amplifier having input winding means and output winding means,
a D.C. voltage source, current responsive output means, means connecting said D.C. voltage source through said current responsive means to the output winding means of said magnetic amplifier to normally saturate said magnetic amplifier,
means connecting the output of said oscillator to the input winding means of said magnetic amplifier to integrate the cycling of said oscillator and to reset said magnetic amplifier only in the presence of flame,
and means including said current responsive output means responsive only to reset of said magnetic amplifier.

3. A self-checking flame detector comprising:
a flame sensor of the type having short time duration signal pulses of a frequent rate upon being subjected to a flame, and having short time duration background signal pulses of random rate in the absence of flame,
controllable current responsive means operatively associated with said flame sensor to render said flame sensor operative to sense a flame in a first condition of operation of said current responsive means and inoperative to sense a flame in a second condition of operation of said current responsive means,
a pulse stretcher in the form of a one cycle oscillator having an output and having an input connected to be controlled by said flame sensor to thereby trigger said oscillator at a random rate in response to said background signal pulses and to trigger said oscillator at a frequent rate in response to the presence of a flame, the output of said oscillator comprising a long time duration D.C. voltage pulse of a given polarity for each cycle of said oscillator,
a magnetic amplifier means having input winding means and output winding means, D.C. voltage means, means connecting said output winding means in circuit with said D.C. voltage means and said current responsive means to normally saturate said magnetic amplifier means and place said current responsive means in said first condition of operation wherein said flame sensor is operative to sense a flame,
means connecting said input winding means in circuit with the output of said oscillator to reset said magnetic amplifier means as said oscillator is triggered at said frequent rate and to place said current responsive means in said second condition of operation wherein said flame sensor is inoperative to sense the presence of flame, whereupon said current responsive means cycles between said first and second conditions of operation upon the presence of flame,
and output means responsive only to cycling of said current responsive means.

4. Condition detecting apparatus, comprising:
condition sensing means of the type having an inherent background count rate of a random and infrequent interval, and having a count rate of a random but frequent interval upon said sensing means being subjected to a condition to which it is sensitive,
pulse stretching means having an input and a D.C. output, said pulse stretching means comprising a triggered one cycle oscillator having a saturable transformer, the saturation characteristics of said transformer providing a uniform D.C. output pulse for each cycle thereof,
magnetic amplifier means having an output winding and an input winding, D.C. voltage means, means connecting said output winding in circuit with said D.C. voltage means to normally saturate said magnetic amplifier means, said magnetic amplifier means being responsive to a D.C. input to integrate said input and provide an output only in the event that said D.C. input is sufficient to reset said magnetic amplifier means,
and circuit means connecting said condition sensing means in controlling relation to the input of said pulse stretching means, and connecting the D.C. output of said pulse stretching means in controlling relation to the input winding of said magnetic amplifier means.

5. In combination:
a triggered one cycle oscillator including a saturable transformer and a pair of controllable current conducting devices interconnected with windings of said transformer in a manner to cause said transformer to be driven into saturation and to be reset from saturation for each cycle of said oscillator, said oscillator requiring an input signal pulse to initiate each cycle,
output means connected to said oscillator to provide an output signal for each cycle of said oscillator,
magnetic amplifier means having power winding means, a source of D.C. voltage, circuit means interconnecting said source of D.C. voltage with said power winding means to normally saturate the core of said magnetic amplifier means,
a reset control winding for said magnetic amplifier means, circuit means interconnecting said output means with said reset control winding in a manner to reset said core dependent upon the integration of said output signal,
and means connected in circuit with said magnetic amplifier power winding means and responsive only to the resetting of said core.

6. Condition detecting apparatus, comprising:
condition sensing means of the type having an inherent background signal count rate of a random and infrequent interval, and a frequent signal count rate upon being subjected to a condition to which said sensing means is sensitive,
pulse stretching means comprising a triggered one cycle oscillator having a saturable transformer and having input means connected to be controlled by said condition sensing means, said oscillator being triggered for a cycle of operation by a count pulse and providing a fixed quantity of D.C. electrical energy at an output for each cycle thereof,
and integrating means comprising magnetic amplifier means having input means, output winding means, D.C. voltage means, means connecting said output winding means in circuit with said D.C. voltage means to normally saturate said magnetic amplifier means, means connecting said input means to be controlled by the D.C. output of said pulse stretching means and to be reset from saturation only by frequent cycles of oscillation of said pulse stretching means indicative of the presence of said condition.

7. Condition detecting apparatus, comprising:
condition sensing means of the type having an inherent background count pulse rate of a random and infrequent interval, and having a frequent count pulse rate upon being subjected to a condition to which said sensing means is responsive,
pulse stretching means comprising a triggered one-cycle oscillator having a saturable transformer and having input means connected to be controlled by said condition sensing means, said oscillator being triggered for a cycle of operation by a count pulse and providing a fixed quantity of D.C. electrical energy at an output for each cycle thereof,
integrating means comprising magnetic amplifier means having input means, having output winding means, D.C. voltage means, means connecting said output winding means in circuit with said D.C. voltage means to normally saturate said magnetic amplifier means, and means connecting said input means to be controlled by the output of said pulse stretching means and to be reset from saturation by frequent cycles of oscillation of said pulse stretching means indicative of the presence of the condition, first output means controlled by said magnetic amplifier means output winding means and effective upon said magnetic amplifier means being reset from saturation to interrupt the ability of said sensing means to sense the condition, to thereby simulate the absence of the condition and to thus cause cycling of said first output means in response to the presence of the condition so long as the apparatus is capable of sensing both the presence of the condition and the simulated absence of the condition, and second output means controlled by said first output means and responsive only to cycling of said first output means.

References Cited by the Examiner
UNITED STATES PATENTS

| | | | |
|---|---|---|---|
| 2,956,168 | 10/1960 | Pinckaers | 250—83.6 |
| 3,012,146 | 12/1961 | Hamelink | 250—83.6 |
| 3,206,694 | 9/1965 | Bates | 307—88.5 |

ARTHUR GAUSS, *Primary Examiner.*

J. S. HEYMAN, *Assistant Examiner.*